United States Patent [19]

Schroeder

[11] 4,111,364
[45] Sep. 5, 1978

[54] HERBICIDE APPLYING MACHINE

[75] Inventor: Merrill W. Schroeder, Fresno, Calif.

[73] Assignee: Gerrit Vander Pol, Modesto, Calif.

[21] Appl. No.: 754,268

[22] Filed: Dec. 27, 1976

[51] Int. Cl.² .......................................... A01N 17/02
[52] U.S. Cl. .................................. 239/77; 15/340; 118/72; 239/127; 239/172
[58] Field of Search ............... 239/77, 127, 172, 176, 239/588, 146, 175, 78; 47/1.5, 1.7, 2, 58, DIG. 4; 134/102, 172; 15/340; 118/72, 305

[56] References Cited

U.S. PATENT DOCUMENTS

| | | | |
|---|---|---|---|
| 2,134,799 | 11/1938 | Pass | 239/127 |
| 3,586,237 | 6/1971 | Taylor | 239/172 X |
| 3,776,459 | 12/1973 | Bonvicini | 239/77 |

Primary Examiner—Bruce H. Stoner, Jr.
Assistant Examiner—Andres Kashnikow
Attorney, Agent, or Firm—Huebner & Worrel

[57] ABSTRACT

A mobile herbicide applying machine adapted for ground traversing movement over a field planted with a row crop and having a frame, a blower mounted on the frame, a manifold mounted on the frame and connected to the blower, a cleaning conduit connected to the manifold having an air outlet directed substantially horizontally and laterally of the direction of ground traversing movement adjacent to the ground surface, a spraying conduit connected to the manifold resistively retractable on contact with an obstruction having an air outlet rearwardly of the outlet of the cleaning conduit directed obliquely downwardly against the ground surface, a proportioning valve mounted in the manifold for regulating the relative air flow from the cleaning and spraying conduits, a reservoir for liquid herbicide mounted on the frame, a herbicide nozzle mounted in the outlet of the spraying conduit, a pump for supplying herbicide from the reservoir to the nozzle, and a power drive mechanism connected to the blower and the pump.

4 Claims, 8 Drawing Figures

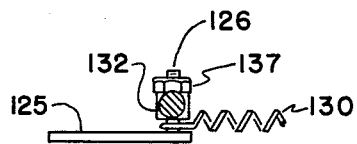
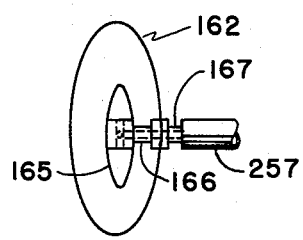
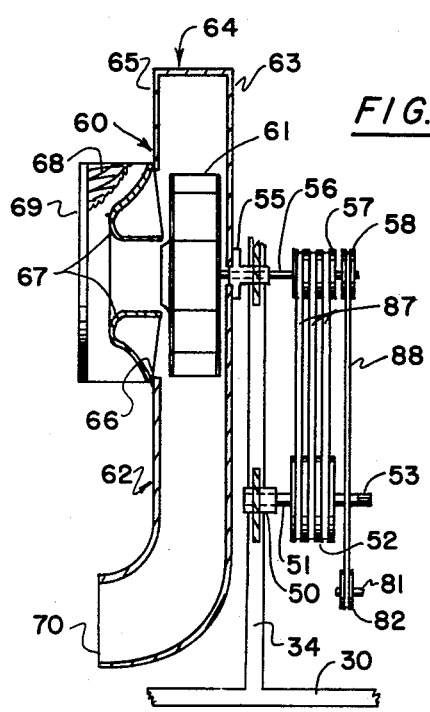
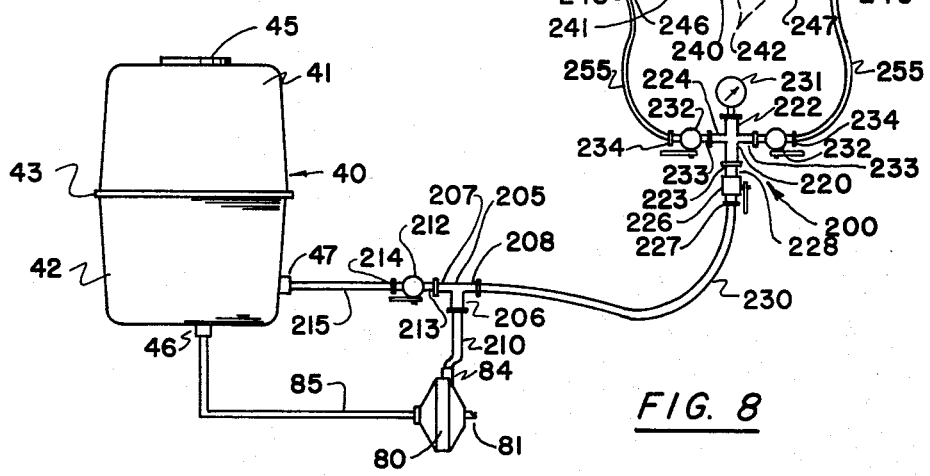

HERBICIDE APPLYING MACHINE

BACKGROUND OF THE INVENTION

1. Field of the Invention

The present invention relates to a herbicide applying machine, and more particularly to such a machine which blows debris from the ground surface along a row of plants to be weeded or sterilized and immediately thereafter applies herbicide to said ground surface.

2. Description of the Prior Art

The prior art includes various approaches for controlling weeds in commercial agriculture. Mechanical weeding, as by special plows, present difficulties in avoiding damage to individual plants of the crop, especially when they are relatively closely planted in rows, and in any case results in uncovering buried weed seeds which then germinate.

The use of herbicides avoids these problems, but existing machines for applying herbicides are relatively ineffective when used with herbicides which are placed in or on the soil since the herbicide is absorbed by debris, such as dead leaves, which blows away or is otherwise removed taking the herbicide with it. This problem is particularly serious with row crops since debris tends to accumulate along the rows of trunks or stems where it is especially desired to apply the herbicide. If an air stream is used to carry the herbicide to the row, a method commonly used in the art, and the air stream is given sufficient velocity to remove the debris, the velocity must be higher than is required only for applying the herbicide resulting in overspray, or application of herbicides beyond the desired area, and waste of herbicide by its absorption by the debris or deposit thereon. Overspray is of particular importance in an era where the dangers to the environment from agricultural chemicals are of increasing concern and is, in any event, a further waste of herbicide.

The problems of applying herbicides are complicated by the desirability of having a machine which can apply herbicides to crops of greatly varying row widths with, in some cases, the need to avoid contact of the herbicide with plants growing between the rows. A particular complication arises from the common practice of mixing for simultaneous application herbicides which require soil contact with herbicides which require leaf contact so that the spray used for applying the herbicides must be directed for proper application to both leaves and soil without the waste and environmental dangers of overspraying.

SUMMARY OF THE INVENTION

Therefore, it is an object of the present invention to provide an improved machine for applying herbicides to row crops.

Another object is to provide a herbicide applying machine which removes debris from target areas before applying the herbicide.

Another object is to provide such a machine which applies herbicides requiring soil contact by spraying without waste of herbicide and with minimal danger to the environment.

Another object is to provide such a machine adapted to apply herbicides requiring leaf contact simultaneously with herbicides requiring soil contact.

Another object is to provide such a machine which can be adapted to apply various consistencies of herbicides to varying widths of rows and heights of plants.

A still further object is to provide such a machine which is not seriously damaged by contact with row crops such as trees or vines and is generally sufficiently rugged for argricultural use in the field.

Further objects and advantages are to provide improved elements and arrangements thereof in a machine for the purposes described which is dependable, economical, durable, and fully effective in accomplishing its intended purposes.

BRIEF DESCRIPTION OF THE DRAWINGS

FIG. 5 is a fragmentary section taken on line 5—5 of FIG. 3.

FIG. 6 is an end view of a sprayer outlet and a herbicide nozzle utilized in the machine of FIG. 1.

FIG. 7 is a fragmentary vertical and longitudinal section of a blower assembly and drive mechanism therefor.

FIG. 8 is a schematic view showing a liquid herbicide supply system and air flow paths of the machine of FIG. 1.

DESCRIPTION OF THE PREFERRED EMBODIMENT

Figure 1:
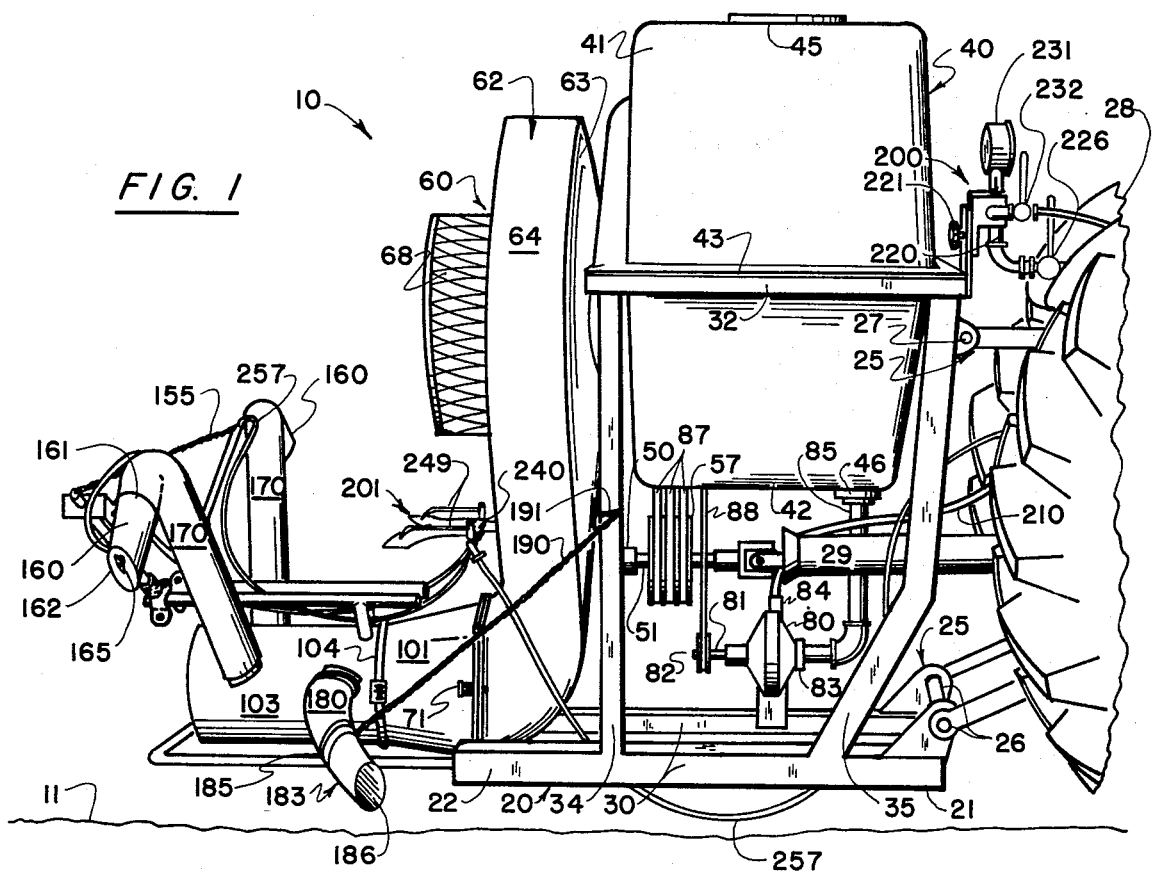
FIG. 1 is a side elevation of a herbicide applying machine embodying the principles of the present invention showing the machine mounted for earth traversing movement on a tractor, which is fragmentarily represented.

Referring more particularly to the drawings, a herbicide applying machine embodying the principles of the present invention is generally indicated by the numeral 10. The machine is adapted for ground traversing movement over a soil surface 11 along a longitudinal axis in a predetermined direction between adjacent rows of crops.

The herbicide applying machine 10 has a main frame 20 having a forward portion 21 and a rearward portion 22. The forward portion 21 of the main frame has forwardly disposed therefrom a well known three point hitch 25 having a pair of lower laterally disposed hitch points 26 and an upper single centrally disposed hitch point 27. The three point hitch adapts the herbicide applying machine for connection to a tractor 28 which is fragmentarily represented and has a conventional power take off 29. The tractor 28, through the three point hitch 25, supports the machine 10 at a predetermined height above the soil surface 11 for transport during operation or travel between points of use. The distance can be adjusted by the hitch 25 in the well known manner.

The main frame 20 has a pair of elongated base bars 30 having their longitudinal axes disposed substantially horizontally and parallel to the normal direction of earth traversing movement of the herbicide applying machine 10. The elongated base bars 30 are individually mounted on and extend rearwardly from the lower hitch points 26 of the three point hitch 25. A substantially horizontal, rectangular reservoir frame 32 is positioned in spaced relation above the forward portions of the base bars 30 and is supported thereon by a rearward, laterally disposed pair of substantially vertical posts 34 and by a forward pair of posts 35.

The herbicide applying machine 10 has a herbicide reservoir 40, best shown in FIGS. 1 and 8, which is substantially rectangular in plan view, and is fitted within the rectangular reservoir frame 32. The reservoir has a top portion 41, a bottom portion 42, and a belt 43 centrally disposed thereon and extending horizontally thereabout. The belt 43 is mounted on and upwardly of the reservoir frame 32 so that the bottom end of the reservoir is in spaced relation above the base bars 30 of the main frame 10. The top portion of the reservoir 40 is provided with a filling opening which is closed by a lid 45. An outlet 46 is provided for the reservoir 40 on its bottom portion 42. A laterally disposed agitation opening 47 is positioned in the reservoir 40 adjacent to the bottom thereof.

As best shown in FIGS. 1 and 7, a first bearing 50 is mounted on and between the rearward pair 34 of posts and defines a substantially horizontal longitudinally disposed axis adjacent to the base bars 30. A power take off shaft 51 has a forward portion received for rotational movement in the first bearing 50 and extends rearwardly therefrom. The power take off shaft 51 has a large pulley 52 rotating therewith positioned rearwardly of and adjacent to the first bearing 50. The power take off shaft terminates rearwardly of the large pulley 52 in an end 53 provided with splines adapted to engage the power take off 29 of the tractor 28 for rotational drive therefrom.

A second bearing 55 is mounted on and between the rearward pair of posts 34 above the first bearing 50 and defines an axis substantially parallel to the power take off shaft 51. A blower shaft 56 is received for rotational movement in the second bearing 55 and has forward and rearward extensions oppositely projecting from the second bearing. The forward extension of the blower shaft 56 has a small pulley 57 mounted for rotation therewith adjacent to the second bearing 55 and above the large pulley 52. A pump driving pulley 58, of substantially the same diameter as the small pulley 57, is mounted on the rearward extension of the blower shaft 56 forwardly adjacent to said small pulley 57 for rotation with the blower shaft.

A centrifugal blower assembly 60 is mounted on and rearwardly of the rearward pair of posts 34. The blower assembly has an impeller 61 mounted on the rearward extension of the blower shaft for rotation therewith. The blower assembly has a housing 62 substantially enclosing the impeller 61 for reception of air discharged therefrom. The housing 62 has a forward substantially vertical planar portion 63 mounted on the rearward posts 34 between the impeller and said posts. Said forward planar portion 63 has an opening, not shown, through which the blower shaft extends. The housing 62 also has a central portion 64 substantially circumferentially disposed about the impeller 61 and extending rearwardly from the forward planar portion 63 and a rearward substantially vertical planar portion 65 mounted on the rearward edge of the circumferentially disposed central portion 64. The rearward planar portion 65 of the housing 62 has an opening 66 concentric with and of somewhat larger diameter than the impeller 61. A circular funnel shaped air inlet 67 is mounted on the rearward planar portion 65 with the periphery of the air inlet in circumscribing relation with the opening 66 adapted to direct air centrally of the impeller 61. A cylindrical inlet screen 68 extends rearwardly from the periphery of the air inlet 67 to a disk 69 which is substantially parallel to the rearward planar portion 65 of the housing 62.

The housing 62 of the blower assembly 60 has a rearwardly and longitudinally directed rectangular discharge opening 70 disposed between and adjacent to the rearward ends of the base bars 30. A pair of clamps 71, best shown in FIG. 4, are laterally oppositely disposed of the rectangular discharge opening 70 and are adapted releasably to connect elements subsequently to be described to said opening for utilization of air delivered therefrom.

A herbicide pump 80, as best shown in FIG. 1, is mounted on and inwardly disposed from one of the base bars 30 below the herbicide reservoir 40. The herbicide pump 80 has a shaft 81 extending rearwardly therefrom substantially parallel to the blower shaft 56. A herbicide pump driven pulley 82 is mounted on the shaft 81, substantially aligned longitudinally with the herbicide pump driving pulley 58. The herbicide pump 80 is provided with an intake connection 83 and a discharge connection 84. A pump intake conduit 85 interconnects the intake connection 83 of the herbicide pump with the outlet 46 of the herbicide reservoir 40.

A plurality of blower drive belts 87, shown in FIGS. 1 and 7, are extended about the large pulley 52 of the power take off shaft 51 and about the small pulley 57 of the blower shaft 56 for driving the blower shaft 56. A pump drive belt 88 is extended about the pump driving pulley 58 on the blower shaft and about the pump driven pulley 82 on the pump shaft 81 for actuating the herbicide pump 80.

Figure 4:
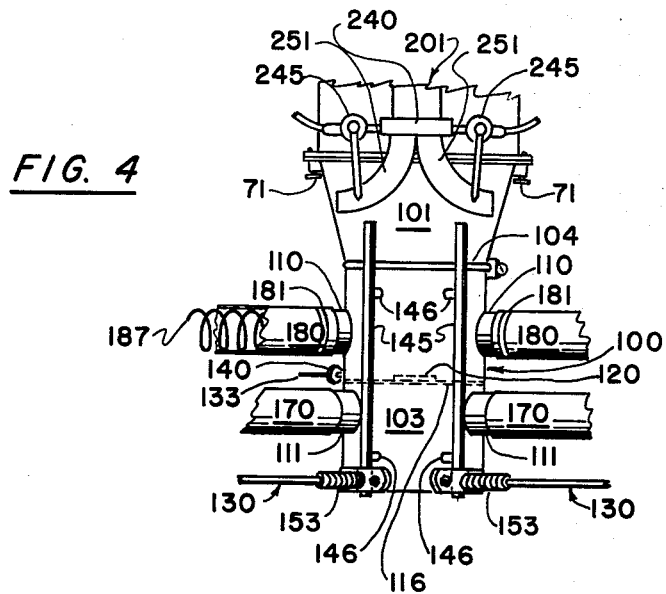
FIG. 4 is a face view, at a somewhat enlarged scale, of a proportioning valve and elements associated therewith mounted within the manifold of FIG. 3.

An elongated air manifold 100, best shown in FIGS. 1 and 4, is releasably mounted on the discharge opening 70 of the blower housing 62 by the clamps 71 and extends rearwardly of said opening and the base bars 30 of the main frame 10. The longitudinal axis of the manifold 100 is substantially parallel to and disposed centrally between and upwardly of the base bars 30 of the frame 20. The air manifold 100 has a forward adapter 101 which at its forward end is mounted on the rectangular blower discharge openings and converges rearwardly to define a circular opening 102. The manifold 100 has a cylindrically tubular body 103 of substantially the same diameter as the circular opening 102 juxtapositioned to said opening for the reception of air therefrom and extending rearwardly thereof. The tubular body 103 is mounted on the adapter 101 by a clamp 104. The rearward end of the tubular body 103 is closed by a disk 105, best shown in FIG. 2, substantially perpendicular to the longitudinal axis of the manifold. The tubular body 103 of the air manifold has a pair of cleaning air connection tubes 110 extending oppositely laterally and substantially horizontally therefrom adjacent to and rearwardly of the adapter 101. The tubular body also has a pair of spraying air connection tubes 111 extending oppositely laterally and upwardly therefrom adjacent to and forwardly of the disk 105 closing the rearward end of the tubular body.

Figure 3:
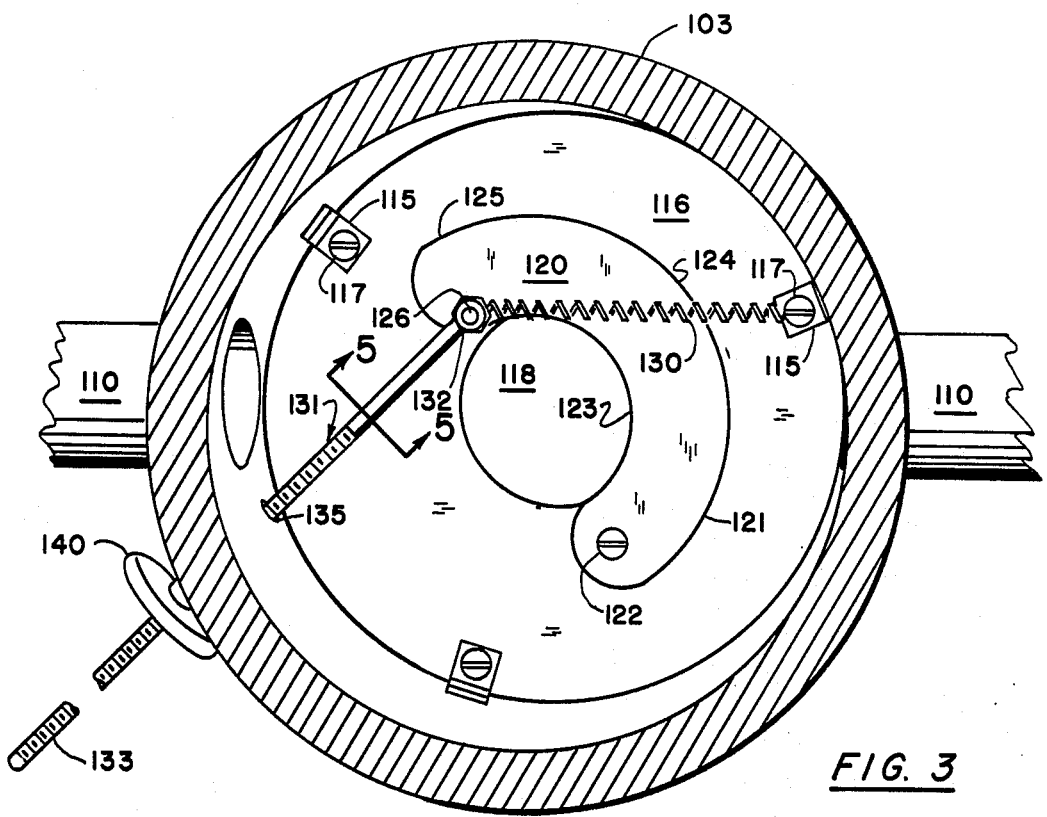
FIG. 3 is a top plan view of an air manifold and elements associated therewith.

A plurality of mounting tabs 115, shown in FIG. 3, are fixed within the tubular body 103 and extend substantially radially inwardly thereof between the cleaning connection tubes 110 and the spraying connection tubes 111. A circular valve plate 116 is closely fitted within and perpendicularly disposed to the tubular body 103 and is mounted on the tabs 115 by screws 117. The valve plate 116 has a central circular orifice 118 substantially smaller in diameter than the inside diameter of the tubular body 103. A crescent shaped planar proportioning valve 120 is pivotally mounted at an end 121 to the valve plate 116 by a pivot screw 122 positioned between the orifice 118 and the inward surface of the tubular body 103. The pivot screw 122 defines a pivotal axis substantially parallel to the longitudinal axis of the tubular body 103. The crescent shaped positioning valve has a concave edge 123 conforming substantially to the shape of the circumference of the orifice 118 and has an opposite arcuate convex edge 124 curved substantially concentrically with the concave edge 123 and spaced therefrom approximately the diameter of the circular orifice 118. The crescent shaped valve 120 has an end 125 opposite to the pivotally mounted end 121 having a screw threaded pin 126, best shown in FIG. 5, mounted thereon and extending axially therefrom in a direction opposite to the valve plate 116. A tension spring 130 interconnects the pin 126 and one of the screws 117 mounting the valve plate 116 and urges the proportioning valve for valve opening pivotal movement toward its convex edge. A proportioning valve rod 131 has an end 132 pivotally mounted on the pin 126 on the end 125 of the proportioning valve 120 and has a screw threaded shank 133 extending from the pin 126 substantially parallel to the valve plate 116 in angular relation to the tension spring 130. The shank 133 extends through an opening 135 in the tubular body 103 of the manifold 100 and is provided throughout its length with male screw threads. The tension spring 130 and the end 132 of the proportioning valve rod 131 are secured on the screw threaded pin 126 by a nut 137. A proportioning valve adjusting knob 140 engages the screw threaded shank 133 of the rod 131 outwardly of the tubular body of the manifold and is urged to engage the outer surface of said body by the tension spring 130. The direction of air flow in relation to the air manifold 100, the proportioning valve 120, the cleaning air connection tubes 110 and the spraying air connection tubes 111 is indicated by the arrows 142 shown in FIG. 8.

Figure 2:
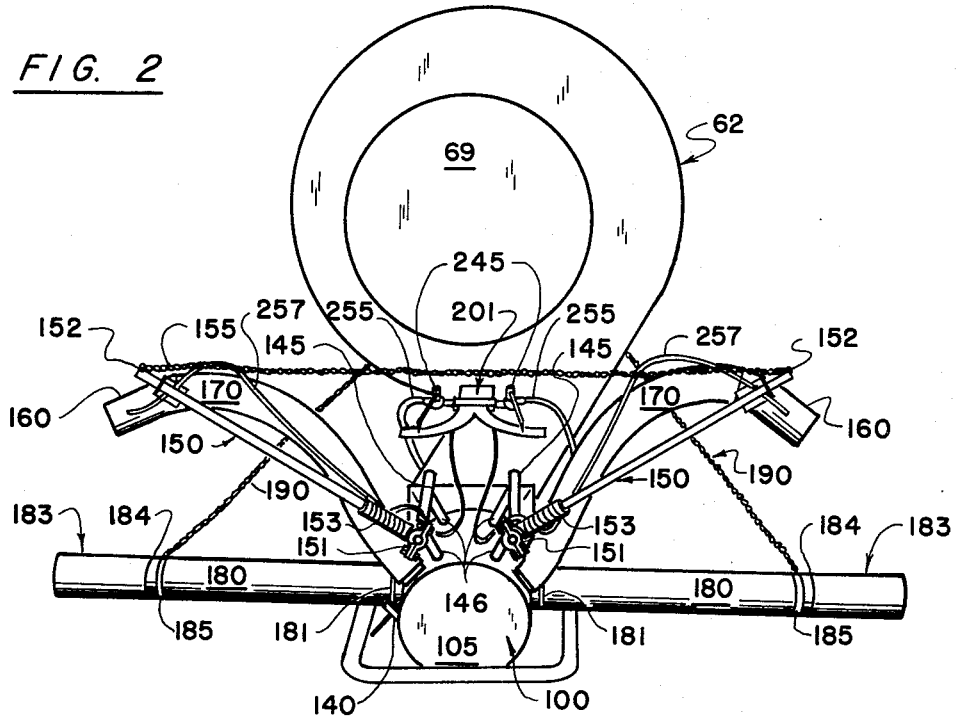
FIG. 2 is a rear elevation of the machine of FIG. 1.

A pair of sprayer mounting bars 145, best shown in FIGS. 1, 2, and 3, are fixed on and substantially parallel with the tubular body 103 of the air manifold 100 upwardly of the spraying air connection tubes 111. The sprayer mounting bars 145 extend approximately the length of the manifold 100 and each of said bars is mounted thereon by a pair of distance pieces 146 extending radially from the tubular body 103 adjacent to, respectively, the forward and rearward ends thereof. A pair of flexible sprayer outlet support rods 150 of a type well known in the art have inward ends 151 individually mounted on the sprayer mounting bars 145 and extend substantially right angularly thereto upwardly and laterally therefrom substantially beyond the main frame 20 to outward ends 152. The inward ends 151 of the sprayer support rods 150 are adapted releasably to clamp the sprayer mounting rods for movement axially therealong and pivotally about the axis thereof. Each sprayer support rod is formed adjacent to its respective mounting bar 145 by a length of coil spring 153 which urges the portion of the support rod outwardly of the coil spring into a substantially radial relationship with said mounting bar, but which allows the support rod to flex at the coil spring. A plurality of chains 155 interconnect the outward ends 152 of of the sprayer support rods with sufficient tension to prevent said rods from sagging downwardly.

A pair of tubular sprayer outlets 160 are individually mounted on the outward ends 152 of the sprayer support rods 150. Each sprayer outlet 160 is releasably clamped at its central portion to said outward end 152 for pivotal movement about an axis substantially parallel to the longitudinal axis of the manifold 100 and is normally pivoted so as to be directed downwardly and laterally toward the soil surface 11. Each tubular sprayer outlet 160 has an inwardly disposed end 161 of substantially circular cross section and an opposite discharge end 162 which is, as best shown in FIG. 6, of oval cross section having the longitudinal axis substantially vertically disposed. A nozzle 165 is mounted centrally within each oval discharge end 162 of the sprayer outlets by a tube 166 which extends rearwardly through its respective sprayer outlet 160 to a herbicide connection 167. Each nozzle is elongated with its longitudinal axis substantially coinciding with the longitudinal axis of its respective discharge end 162 for uniform distribution of liquids issuing from the nozzle within the oval cross section of said discharge end 162. A pair of flexible tubular spraying conduits 170 individually interconnect each inward end 161 of the sprayer with the laterally correspondingly spraying air connection tube 111 of the manifold 100.

Each cleaning air tube 110 has a resiliently flexible tubular cleaning conduit 180 mounted substantially coaxially thereon by an inner hose clamp 181. Each cleaning conduit 180 extends laterally outwardly from the air manifold substantially beyond the main frame 20 to a tubular cleaning outlet 183 having an inner end 184, which is secured within its respective cleaning conduit by an outer hose clamp 185, and an outward discharge end 186 of oval cross section with the longitudinal axis substantially horizontally disposed. The cleaning conduit 180 is adapted to be resiliently urged into a substantially straight configuration, as by an internal coil spring 187, shown in FIG. 3. A pair of deflecting chains 190 individually interconnect each outer hose clamp with a point 191 vertically centrally disposed on the laterally corresponding post 34 of the rearward pair of posts which support the reservoir frame 32. The chains 190 may be formed of relatively weak and inexpensive material such as plastic.

The herbicide applying machine 10 has a forward herbicide control assembly 200, best shown in FIGS. 1 and 8, mounted on the reservoir frame 32 forwardly of the reservoir 40 and has a rearward herbicide control assembly 201 mounted on and rearwardly of the blower. The forward herbicide control assembly 200 has a conventional "T" pipe fitting 205 mounted on the reservoir frame 32 in a laterally offset position. The "T" fitting has a central connection 206, an outwardly disposed agitation lateral connection 207 and an opposite spraying lateral connection 208. A pump discharge conduit 210 interconnects the central connection 206 of the "T" fitting with the discharge connection 84 of the herbicide pump 80. An agitation control valve 212, having an inlet connection 213 and an outlet connection 214, is mounted by said inlet connection on the outwardly disposed lateral connection 207 of the "T" fitting for flow communication therewith. An agitation conduit 215 interconnects the outlet connection of the agitation valve 212 with the agitation opening 47 of the herbicide reservoir 40.

A conventional cross pipe fitting 220 is releasably mounted by a clamp 221 on the reservoir frame 32 laterally opposite to the "T" fitting 205. The connections, which are subsequently to be described, to the cross fitting 220 are by flexible conduits of sufficient length that said fitting can be mounted on the tractor 28 if desired by the clamp 221 for convenient access when the spraying machine 10 is in use. The cross fitting 220 has an upwardly disposed connection 222, a downwardly disposed connection 223, and a pair of laterally opposite horizontally disposed connection 224. A pressure regulating valve 226 having an inlet connection 227 and an outlet connection 228 is mounted by said outlet connection 228 on the downwardly disposed connection 223 of the cross fitting 220 for flow communication therewith. A flexible spray supply conduit 230 interconnects the inlet connection 227 of the pressure regulating valve 226 with the spraying lateral connection 208 of the "T" fitting 205. A pressure gauge 231 is mounted on the upwardly disposed connection 222 of the cross fitting for indication of fluid pressure in said fitting. A pair of shut off cocks 232, each having an inlet connection 233 and an outlet connection 234, are individually mounted by their respective inlet connections 233 on the horizontally disposed connections 224 of cross fitting 220 for flow communication therewith.

The rearward herbicide control assembly 201 has a substantially horizontal elongated bar manifold 240 mounted on the rearward planar portion 65 of the blower housing 62 downwardly of the blower inlet screen 67 with its longitudinal axis substantially parallel with the said planar portion 65. The manifold 240 has a pair of inlet connections 241 at the opposite ends thereof which communicate individually with a pair of longitudinal passages 242 extending inwardly within the bar manifold 240 from said inlet connections 241. The longitudinal passages 242 do not communicate internally of the bar manifold, but have a pair of individual downwardly disposed outlet connections 243. A pair of herbicide flow regulating cocks 245, each having an inlet connection 246 and an outlet connection 247, are individually mounted by their respective outlet connections 247 on the inlet connections 241 at the ends of the bar manifold 240. The herbicide flower regulating cocks 245 are of a type well known in the art which have a stem 248 requiring a ninety degree rotational movement from the closed position to the fully open position and are mounted with the respective axes of the stems extending substantially vertically upwardly from the cocks 245. Each of the stems 248 has a rod like handle 249, best shown in FIGS. 3 and 8, extending horizontally in substantially right angular relation therefrom to a pointed distal end 250 which moves over an arcuate horizontal scale 251 mounted on the bar manifold 240. The scale 251 is graduated in units of flow corresponding to the relative rotation of its respective valve stem 248.

A pair of flexible manifold supply conduits 255 individually interconnect the outlet connections 234 of the shut off cocks 232 with one of the inlet connections 246 of the flow regulating cocks 245. A pair of flexible nozzle supply conduits 257 individually interconnect each outlet connection 243 of the passages 242 in the bar manifold 240 with the laterally corresponding herbicide connection 167 of the nozzles 165 in the sprayer outlets 160.

The herbicide flow paths of the herbicide applying machine 10 can be summarized as follows: The liquid herbicide is stored in the reservoir 40 for delivery by the conduit 85 to the intake connection 83 of the herbicide pump 80. The pump 80 discharges the herbicide under pressure through its discharge connection 84 and the conduit 210 to the "T" fitting 205. The herbicide flow can be divided at the "T" fitting with a portion of the flow determined by the agitation control valve 212 being returned to the reservoir 40 through the agitation opening 47. The balance of the flow passes through the conduit 230 to the pressure regulating valve 226 which is adapted for adjustment to maintain a predetermined pressure in the cross fitting 220 downstream of the pressure regulating valve 226 as indicated by the pressure gauge 231. The herbicide flow from the pressure regulating valve then divides with a portion passing through each shut off cock and its respective manifold supply conduit 255 to one of the flow regulating cocks 245. The graduations of the arcuate scales 251 of the flow regulating cocks are calibrated to select a desired herbicide flow at the predetermined pressure set by the pressure regulating valve 226 in accordance with the indication of the pressure gauge 231. The herbicide flow determined by each flow regulating cock 245 passes through its respective passage 242 in the bar manifold, conduit 257 and nozzle 165 for discharge into a sprayer outlet 160.

OPERATION

The operation of the described embodiment of the present invention is believed to be clearly apparent and is briefly summarized at this point. The herbicide applying machine 10 is connected to the tractor 28 by the three point hitch 25, and the splined end 53 of the power take off shaft 51 of the machine is engaged with the power take off 29 of the tractor to provide rotational drive for the centrifugal blower assembly 60 and for the herbicide pump 80. When in operation the herbicide spraying machine 10 is supported by the three point hitch 25 which permits the machine to be elevationally positioned as desired. Usually the machine will be raised for transporting to the field and, when in spraying operation, will be lowered until the base bars 30 and the air manifold 100 are adjacent to the soil surface 11. When the machine is not in operation, as when it is disconnected from the tractor, the machine is rested upon the base bars 30.

To utilize the herbicide applying machine 10, the reservoir 40 is, of course, filled with a desired herbicide or mixture of herbicides through the filling opening in the top portion 41 of the reservoir. Before applying herbicide the herbicide flow regulating cocks 245 are adjusted to provide desired individual herbicide flows to the laterally opposite pair of nozzles 165 in the sprayer outlets 160 by positioning the pointed distal ends 250 of the handles 249 at the desired graduation on the respective scales 251. If desired, herbicide flow can be shut off to one of the nozzles 165 either with its respective regulating cock 245 or shut off cock 232. Before applying herbicide the machine 10 is also adjusted for row width, amount and type of debris on the soil surface, plant height, and type or mixture of herbicide to be applied with consideration being given to whether the herbicide is to be applied primarily to the soil surface or to the leaves of weeds to be eradicated or to both the soil and the leaves.

The herbicide spray is adjusted for row width and spray height by releasing the inward ends 151 of the sprayer support rods 150 from the sprayer mounting bars 145 on the air manifold and then rotating the rods 150 about the bars to position the outward ends 152 of the rods 150 with their respective sprayer outlets 160 laterally and vertically with respect to the rows of crops to be sprayed with herbicide. The sprayer outlets 160 can then be adjusted to a desired downward angle by pivoting the sprayer outlets 160 about their respective pivotal connections to the outward ends 152 of the sprayer support rods 150. The effective length of the chains 155 interconnecting said outward ends 152 can then be varied to provide proper tension so that the rods 150 mutually support each other. The cleaning conduits 180 and cleaning outlets 183 are not provided with the same flexibility of adjustment provided for the spraying outlets 160 since the cleaning outlets are directed substantially parallel to the soil surface and the proper height adjustment is automatically provided when the entire herbicide applying machine 10 is elevationally positioned by the three point hitch 25. However, the cleaning outlets may be swung forwardly and inwardly by shortening the deflecting chains 190 connected to said cleaning outlets.

If during movement of the herbicide applying machine 10, the spraying outlets 160 should contact a stationary object, the sprayer support rods 150 will flex at their coil springs 153 allowing the outlets with their flexible conduits 170 to deflect so that no serious damage will be done. Similarly, the resiliently flexible cleaning conduits 180 prevent serious damage if the cleaning outlets 183 contact a stationary object.

The relative air flow from the spraying outlets 160 and from the cleaning outlets 183 is adjusted by the proportioning valve 120 which is positioned in the air manifold 100 between the cleaning air connection tubes 110 and the spraying air connection tubes 111. The spraying connection tubes are downstream and the cleaning connection tubes are, as shown in FIG. 8, upstream of the proportioning valve with respect to the air flow provided by the blower assembly 60. As a result, closing the proportioning valve against the tension of the spring 130 by rotating the knob 140 on the screw threaded shank 133 of the valve rod 131 so that the end 132 of the rod 131 is moved toward the knob 140 causes a relatively larger proportion of the air flow to be discharged from the cleaning outlets 183. Reversing these movements, will, of course, cause a relatively larger proportion of the air flow to be discharged from the spraying outlets 160. In practice, the total air flow remains relatively constant since the power take off 29, as is usual with tractors, rotates at a relatively constant speed and the air flow to the spraying outlets 160, which must be adjusted within relatively narrow limits to provide sufficient herbicide coverage without overspraying, is set to a proper value with the proportioning valve, and the balance of the air flow discharges through the cleaning outlets 183.

Since the cleaning air connection tubes 110 are upstream of the spraying air connection tubes 111 with respect to the manifold 100 and, particularly, since these tubes 110 and 111 are separated by the valve plate 116 having the orifice 118 which restricts the spraying air flow even when the proportioning valve 120 is fully opened, a significantly larger proportion of the air flow is always discharged from the cleaning outlets than from the spraying outlets. Typical velocity values with approximately equal area outlets for both spraying and cleaning are 250 miles per hour for cleaning but only eighty miles per hour for spraying. A major velocity difference for cleaning and spraying is essential since an air velocity high enough for proper removal of debris results, when herbicide is included in the air stream, in overspraying with resulting environmental hazards and, at least, waste of herbicide. Conversely, if an air velocity low enough for proper spraying of herbicide is employed for blowing debris from the area to which herbicide is to be applied, the debris will not be satisfactorily removed.

When the herbicide applying machine 10 is in a location at which herbicide spraying is to begin, the power take off 29 of the tractor 28 is engaged for rotational movement causing the blower assembly 60 to provide air flow for spraying of herbicide and cleaning of debris and causing the herbicide pump 80 to provide herbicide flow for spraying and for agitation. When the pump 80 is first started, the agitation control valve 212 is adjusted so that sufficient herbicide is bypassed to the reservoir 40 through the agitation opening 47 so that suspended herbicide particles do not settle out. Of course, if the herbicide mixture being used is completely soluble no agitation is required.

As soon as herbicide spraying is started by opening the shut off cocks 232, and at other times as may be required, the pressure regulating valve 226 is adjusted according to the indication of the pressure gauge 231 so that the predetermined pressure at which the flow regulating cocks 245 are calibrated is maintained in the cross pipe fitting 220.

Once these initial adjustments are complete, the herbicide spraying machine 10 is transported by the tractor 28 between rows of crops with the air streams discharged by the cleaning outlets 183 removing debris from the soil surface to be sprayed, and with the air streams discharged by the spraying outlets 160 conveying herbicide mixed therewith by the nozzles 165 to the soil and/or the plants to be eradicated. The herbicide spray may be temporarily conveniently stopped, as when changing rows, without stopping air flow or agitation of herbicide in the reservoir 40 by temporarily closing the shut off cocks 232.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. A herbicide applying machine comprising:
(A) a mobile frame having predetermined forward and rearward end portions;
(B) a source of air under pressure;
(C) cleaning means borne by the frame connected to said source adapted to discharge air from the source along the ground to displace debris from the ground adjacent to the frame;
(D) spraying means borne by the frame connected to said source adapted to discharge herbicide in an air stream from said source onto the soil in following relation to the cleaning means; and
(E) a proportioning valve in said cleaning means and said spraying means for equally and oppositely regulating the air discharged through said means.

2. A herbicide applying machine comprising:
(A) a mobile frame having predetermined forward and rearward end portions;
(B) a source of air under pressure mounted on the frame;
(C) conduit means connected to the source and having a pair of outlets, one directed substantially horizontally laterally of the frame adjacent to the ground and the other above and rearwardly of said one outlet directed laterally of the frame and obliquely downwardly against the ground;

(D) means for spraying herbicide into said other outlet to certain the herbicide in air discharged therethrough; and (E) a proportioning valve in said conduit means for equally and oppositely regulating the air released through said outlets.

3. A machine for applying liquid herbicide to the ground comprising:

(A) an elongated frame;

(B) means for supporting the frame for longitudinal earth traversing movement whereby the frame has forward and rearward end portions;

(C) a herbicide reservoir mounted on the forward end portion of the frame;

(D) a pump having a discharge and an intake connected to the reservoir;

(E) a blower having a discharge and being mounted on the frame rearwardly of the reservoir;

(F) drive means connected to the blower and to the pump;

(G) an elongated manifold mounted on the frame, connected to the discharge of the blower, and extended longitudinally rearwardly of the frame;

(H) a cleaning conduit connected to the manifold and laterally extended therefrom having an outlet directed laterally of the frame adjacent to the ground;

(I) a spraying conduit connected to the manifold, upwardly and laterally extended therefrom, and having an outlet downwardly and laterally disposed rearwardly of the outlet of the cleaning conduit;

(J) a nozzle mounted in the outlet of the spraying conduit;

(K) a conduit interconnecting the discharge of the pump and the nozzle; and (L) a proportioning valve mounted in the manifold operable to regulate the proportions of air delivered by the blower out of the cleaning and spraying conduits.

4. The machine of claim 3 in which the proportioning valve is operable equally and oppositely to regulate the air supplied to the cleaning conduit and the spraying conduit.

* * * * *

UNITED STATES PATENT AND TRADEMARK OFFICE
CERTIFICATE OF CORRECTION

PATENT NO. : 4,111,364
DATED : September 5, 1978
INVENTOR(S) : Merrill W. Schroeder It is certified that error appears in the above-identified patent and that said Letters Patent are hereby corrected as shown below:

Column 11, line 4, delete "certain" and substitute ---entrain---.

Signed and Sealed this

Twenty-seventh Day of March 1979

[SEAL]

Attest:

RUTH C. MASON
Attesting Officer

DONALD W. BANNER
Commissioner of Patents and Trademarks